United States Patent

[11] 3,615,601

[72] Inventor Michael Hugo Brodnitz
Matawan, N.J.
[21] Appl. No. 724,612
[22] Filed Apr. 26, 1968
[45] Patented Oct. 26, 1971
[73] Assignee International Flavors & Fragrances, Inc.
New York, N.Y.

[54] ALKYL 1-ALKENYL DI- AND TRISULFIDE COMPOUNDS AND FLAVORING COMPOSITIONS CONTAINING THE SAME
7 Claims, No Drawings

[52] U.S. Cl. ................................................. 99/140 R
[51] Int. Cl. ................................................. A23l 1/22
[50] Field of Search ...................................... 99/140; 260/608, 329

[56] References Cited
UNITED STATES PATENTS
2,446,072  7/1948  Armstrong ................. 260/608

OTHER REFERENCES
Wahlroos et al., " Volatiles From Chives" Chemical Abstracts 64: 3954f (1966).

*Primary Examiner*—Morris O. Wolk
*Assistant Examiner*—Warren Bovee
*Attorney*—Brooks, Haidt & Haffner ABSTRACT: Novel compounds have been discovered which impart cooked onion flavor and aroma to foods treated therewith. Said novel compounds are alkyl-alkenyl disulfides having the formula:

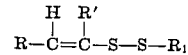

wherein R' is hydrogen or alkyl and R and $R_1$ are alkyl. Representative compounds are methyl propenyl disulfide, propyl propenyl disulfide, and ethyl propenyl disulfide. Compositions containing said compounds preferably at levels of from 0.01 to 20 percent by weight are also disclosed. Additionally, said compositions may contain other disulfides and trisulfides including novel alkenyl trisulfides having the formula:

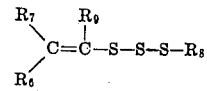

wherein $R_7$ and $R_8$ are alkyl groups and $R_6$ and $R_9$ are hydrogen or alkyl.

ALKYL 1-ALKENYL DI- AND TRISULFIDE COMPOUNDS AND FLAVORING COMPOSITIONS CONTAINING THE SAME

FIELD OF INVENTION

This invention relates to novel synthetic flavoring agents and more particularly to synthetic onion flavoring agents. Specifically, it relates to certain novel alkyl 1-alkenyl disulfides, to their use as onion flavor imparting agents and to compositions containing them and other sulfides and trisulfides.

DESCRIPTION OF PRIOR ART

Artificial flavoring agents of various kinds have received widespread attention in recent years. In many areas, synthetic food flavoring is much preferred over natural flavoring agents, at least in part because of the uniform product relative to flavor constancy that may be obtained thereby. For example, natural food flavoring agents such as extracts, concentrates and the like are very often subject to flavor variations depending upon availability of raw material supply. Such variations can be reflected in the end product resulting in unreliable flavor characteristics, uncertainty as to consumer acceptance and the like. Additionally, the presence of the natural product in the ultimate food may be undesirable because of increased tendency to spoil. This would be particularly troublesome in convenience and snack food application where such products as dips, soups, chips, prepared dinners, sauces, gravies, and the like are apt to be stored by the consumer for some time prior to use.

The fundamental problem in preparing artificial flavoring agents is that of achieving as nearly as possible true flavor reproduction. This generally proves to be a difficult task since the mechanism for flavor development in many foods is not understood. This is true especially in onion flavor characteristics.

Botanically, the onion is the bulb of *Allium cepa*, a member of the lily family. Many other species of *Allium* are widely used in food flavoring or as foods themselves. There may be mentioned, for example, *Allium sativum* (garlic), *Allium ampeloprasum* (leek) and *Allium schoenoprasum* (chives). All of these have characteristic flavors of their own and have been at one time or another the subject of investigations to determine the constituents responsible for, or contributing to, the characteristic flavor. As is very often the case, however, many constituents are found to be common to the various species, and it thus becomes difficult, if not impossible, to ascribe to any one constituent the characteristics of the odor and flavor of the particular species. Additionally, the ultimate effect on flavor must be viewed in terms of whether raw flavor or cooked flavor is desired, the distinction being that constituents contributing to a raw note need not necessarily contribute any flavor characteristics to a cooked flavor note upon heating and indeed constituents found in cooked forms may not have been present in the raw forms.

While, as stated above, there have been various investigations into onion flavor characteristics, definitive statements are lacking. In fact, there has been somewhat of a controversy concerning not only the roles played by various ingredients but indeed whether or not a given material is actually present. The latter situation arises when one investigator reports the presence of a particular material in onion when that material had been reported as being absent by another investigator. The literature has not been consistent, therefore, in its teachings with respect to factors present in onions and has not given the sphere of technology much guidance in methods for approaching synthetic flavors.

SUMMARY OF THE INVENTION

In accordance with the present invention, there are provided novel compounds found to possess a flavor and odor virtually indistinguishable from that of cooked onion and which may be employed alone, in combination with other compounds or in composition with a suitable edible carrier to impart cooked onion flavor characteristics to foods.

More particularly, the novel compounds of the present invention are alkyl alkenyl disulfides, preferably essentially free of other sulfides, having the formula:

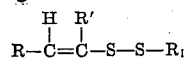

wherein R' hydrogen or alkyl, R, and R₁ are alkyl radicals, all of said radicals preferably being lower alkyl and having up to five carbon atoms such as methyl, ethyl, n-propyl, isopropyl, butyl, sec-butyl and pentyl and the like. Typical of such compounds are methyl propenyl disulfide, propyl propenyl disulfide, ethyl propenyl disulfide, propyl (1-methyl propenyl) disulfide and the like. The propyl propenyl and methyl propenyl disulfide compounds are preferred.

The compounds of the present invention are oily liquids and are characterized by a strong, pleasant cooked onion odor and flavor. The dominant note is one of sweetness with a notable absence of any pungency or lachrymatory factor. The compounds may exist in either the cis or trans isomeric forms and such are contemplated herein.

Infrared spectrographic data for some preferred materials are as follows:

|  | Absorption Wave length | Assignment |
| --- | --- | --- |
| cis-methyl propenyl disulfide | 3.32 | cis-double bond |
|  | 14.6 | cis-double bond |
|  | 7.21 | methyl group |
| trans-methyl propenyl disulfide | 7.21 | methyl group |
|  | 10.68 | trans-double bond |
| cis-propyl propenyl disulfide | 3.32 | cis-double bond |
|  | 14.5× | cis-double bond |
|  | 7.22 | methyl group |
| trans-propyl propenyl disulfide | 7.23 | methyl group |
|  | 10.68 | trans-double bond |

In accordance with a further aspect of the invention, the above compounds are utilized either singly or in admixture with one another, or in combination with other materials to impart a cooked onion flavor and odor to foods or edible materials. Thus, the advantages of the aforementioned disulfides can be achieved, for example, by merely adding a sufficient quantity of one or more of the propenyl disulfides to the desired food. The flavor characteristics are sufficiently strong and persistent so that a desirable flavor and odor is developed using simply the undiluted disulfide. Preferably, however, the disulfide or mixture of disulfides is included in admixture with a suitable conventionally acceptable edible carrier, either solid or liquid, but most preferably liquid, to provide easily handled amounts of the flavoring agent. Such compositions may contain up to 99 percent by weight of the disulfide but preferably are relatively dilute containing disulfide in amounts of the order of from 0.01 to about 20 percent by weight with the remainder being carrier and other adjuvants as desired and as described in more detail below.

Suitable edible carriers include the conventionally acceptable edible carriers include the conventionally acceptable edible, nontoxic materials normally encountered in the food arts including liquids as vegetable oil, soybean oil, cottonseed oil, coconut oil, corn oil, and the like, and solids such as starch, salt, sugar, gum arabic, and the like.

Although the compositions described above are suitable for imparting an acceptable cooked onion flavor to foods of various types, it is a further feature of the present invention to provide compositions containing at least one of certain other sulfides, generally of two classes, the presence of which lends a fuller body of flavor development and enhances the aesthetic quality of the treated food. Both saturated mono-, di-, and trisulfides and unsaturated mono- and trisulfides have been found to be effective in enhancing the flavor imparting characteristics of the unsaturated disulfides such that the resulting flavor and odor developed are virtually indistinguishable from the natural product. In general, these sulfides are compounds of the formula:

$$R_2—S—(S)_n—R_3$$
and
$$R_4—S—(S)_m—R_5$$

wherein $n$ is 0, 1 or 2 and $R_2$ and $R_3$ are alkyl radicals, $m$ is 0 or 2, and $R_4$ is alkenyl and $R_5$ is alkyl. Preferably, $R_2$, $R_3$ and $R_5$ are lower alkyl radicals having up to five carbon atoms, such as methyl, ethyl, propyl, and pentyl, and $R_4$ is preferably lower alkenyl having up to five carbon atoms such as ethenyl, propenyl, isopropenyl, butenyl, pentenyl and the like. Typical of the saturated compounds are methyl propyl sulfide, methyl propyl disulfide, dipropyl disulfide, dipropyl trisulfide, dipropyl sulfide, methyl propyl trisulfide, dipropyl trisulfide and the like. The unsaturated sulfides are illustrated by methyl propenyl sulfide, methyl propenyl trisulfide, propyl propenyl sulfide, propyl propenyl trisulfide and the like. The preferred additional sulfides employed in combination with the alkenyl disulfides of the present invention are the saturated disulfides or trisulfides and most preferably the disulfides.

Quite satisfactory compositions are obtained when at least one of the aforementioned sulfides is included in admixture with one or more of the alkenyl disulfide compounds, and it is a preferred aspect of the invention to use such compositions.

With regard to the amounts of additional sulfide present, the alkenyl disulfides of the invention are strong enough in terms of flavor and odor that they may be used in relatively small quantity compared to the amount of the other sulfides. Thus, when according to this aspect of the invention, there is employed one or more additional sulfides as described, such sulfides are conveniently included at levels ranging from one to 20 and preferably three to six times the weight of alkenyl disulfide employed. Actually, such compositions need not contain any carrier or other adjuvant and will perform quite acceptably. If desired, however, carriers as previously described can be included.

As a further feature of the invention, it has been found desirable to include within the composition a quantity of 3, 4 dimethyl thiophene. It has been discovered that the presence of this heterocyclic sulfide in somewhat minor quantities as compared to the other sulfides, of the order of 0.05 to 0.20 and preferably 0.05 to 0.10 times the amount of alkenyl disulfide present lends a more fully developed character to the food items treated with the composition.

As stated, the composition may also contain a suitable, edible solid or liquid carrier vehicle as desired. Such carriers as previously described may be employed. Additionally, since the sulfide compositions are generally liquids, they can easily be absorbed on a suitable solid carrier such as those hereinabove described, and used as adsorbates. This may be done by blending so much of the liquid as will be conveniently adsorbed on a suitable solid carrier and still retain the solid characteristic of the carrier.

Viewed in the overall, the compositions of the invention thus contain from 0.005 to 99.5 percent by weight of the alkenyl disulfide, 0 to 99.995 percent by weight of the additional mono-, di-, or trisulfide, 0 to 2 percent by weight of the 3,4-dimethyl thiophene, 0 to 99.995 percent of an edible solid or liquid carrier. It is preferred, however, that a carrier be employed in which case the alkenyl disulfide is suitably present at from 0.005 to 20 percent, the mono-, di-, or trisulfide at from 0.005 to 95 percent, the 3,4-dimethyl thiophene at from zero to 0.2 times the amount of alkenyl disulfide and the carrier at from 0.1 to 99.99 percent most preferably 0.1 to 80 percent based on the weight of the entire composition unless otherwise stated.

Other ingredients can be also added to the flavor compositions depending on individual preferences. For example, other unsaturated polysulfides such as allyl disulfide, propyl allyl disulfide, methyl allyl disulfide and the like may be used. These may be added in relatively large quantities and may even be employed in lieu of carriers. These sulfides may often be used at levels ranging from five to 100 times the weight of the alkenyl disulfides.

The compositions of the present invention as indicated above are eminently suited for artificially imparting to foods cooked onion odor and flavor characteristics which are virtually indistinguishable from the natural onion qualities. Typical foods are soups, broths, gravies, sauces, dips, chips, crackers, breads, rolls meat preparations, salads, salad dressings and the like. The actual amount of the flavoring agent used will depend on individual tastes in the case of consumer use, and mass appeal consideration in the case of large-bulk food processing. Ordinarily, these amounts are quite small compared to the amount of food being flavored. On a carrier-free basis, suitable effect is achieved when the alkenyl sulfides constitute from $10^{16}$ to $10^{14}$ percent by weight of the treated food item.

Compounds of the invention and especially the cis and trans methyl propenyl and propyl propenyl disulfides are prepared by treating raw onions in an extraction distillation process whereby said compounds are liberated in free uncomplexed form. In general, this is achieved by extracting the juice from raw onions by pressing, for example, and then subjecting the juice to an elevated temperature distillation. The distillate is then treated with diethyl ether, dried and the ether removed. The residue is then treated by gas-liquid chromatography techniques to isolate and separate the compounds. The alkenyl disulfides and especially the propenyl disulfides are prepared by condensing an appropriate lithium alkenyl compound such as lithium propene with an alkyl disulfur chloride at temperatures below room temperature. The alkyl group of the disulfur chloride then appears in the condensed product. Lithium chloride is obtained as a byproduct of the reaction. Any appropriate alkyl disulfur chloride can be employed such as for example, methyl disulfur chloride, ethyl disulfur chloride, butyl disulfur chloride, pentyl disulfur chloride and the like.

Alkenyl trisulfides having the following formula are novel:

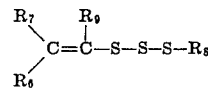

wherein $R_7$ and $R_8$ are alkyl groups and $R_6$ and $R_9$ are hydrogen or alkyl, are conveniently prepared by condensing an $R_8$-alkyl hydrodisulfide with a thioaliphatic acid halide to obtain the corresponding $R_8$-alkyl alkanoyl trisulfide, halogenating the trisulfide to cleave the alkanoyl group and yield the $R_8$-trisulfur halide, and then reacting said halide with an appropriate $R_6$, $R_7$ and $R_9$-containing alkenyl magnesium halide. The following diagram illustrates the conversion using acetyl chlorosulfide as the thioaliphatic acid halide:

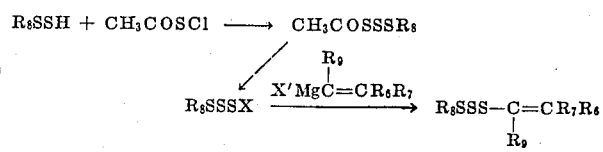

wherein X and X' are halogen atoms. The reaction is preferably run at below room temperature and preferably under anhydrous conditions. The halogenation-cleavage step is preferably achieved using sulfuryl chloride or bromide. The magnesium halide is preferably the bromide, freshly prepared.

Representative alkenyl trisulfides are:
methyl 2-methyl propenyl) trisulfide,
propenyl 2-methyl propenyl) trisulfide,
ethyl 2-ethyl propenyl) trisulfide, methyl propenyl trisulfide,
propyl propenyl trisulfide,
and the like.

The invention will now be described with particular reference to specific embodiments thereof.

EXAMPLE I 60 lbs. of fresh New York State Globe Onion are macerated in a Fitz mill and the juice liberated therefrom is collected. The juice is then submitted to an atmospheric distillation of 100° C until about 20 percent of the volume is distilled off. This distillate is collected, extracted with ether, dried over ammonium sulfate and subjected to gas-liquid chromatographic separation. Separations are carried out on a stainless steel column, 1/4-inch diameter by 10 ft., and the products are recovered therefrom. The liquid phase is 20 percent Carbowax 20M and the support material is Chromosorb W. The gas phase is helium flowing at 80 ml./min. Column temperature is programmed from 70° C. to 170° C. at the rate of 2° C. per minute. The unit is equipped with 10 to 1 effluent splitters and flame ionzation detectors. Cis-methyl propenyl disulfide has an $I_E$ of 6.15 on this column, cis-propyl propenyl disulfide, an $I_E$ of 7.66, methyl propenyl trisulfide, an $I_E$ of 9.13 and 9.15, propyl propenyl trisulfide, and $I_E$ of 10.55 and 10.70, trans-methyl propenyl disulfide an $I_E$ of 6.38 and trans-propyl propenyl an $I_E$ of 7.89. Structure of the compounds is confirmed by NMR spectroscopy.

The $I_E$ is calculated according to the method set forth by E. Kovats in Helvetica Chimica Acta 41, 1915 (1958) as modified by H. Van Den Dool and P. DeC Kratz in *Journal of Chromatography* 11, 463 (1963).

EXAMPLE II

The following ingredients are selected:

| Ingredient | Quantity (Parts/100 total) |
| --- | --- |
| Methyl-propyl disulfide | 2 |
| Methyl-propenyl disulfide | 0.5 |
| Dipropyl-disulfide | 93 |
| Propyl-propenyl disulfide | 4 |
| Diallyl-disulfide | 0.5 |

The ingredients are thoroughly and homogeneously mixed at 25° C. The mixture has an excellent onion flavor definitely enhanced over that obtained when the propyl propenyl and methyl propenyl disulfide constituents are omitted.

EXAMPLE III

The following ingredients are selected:

| Ingredients | Quantity (Parts/100 total) |
| --- | --- |
| Dimethyl-disulfide | 4 |
| Methyl-propyl disulfide | 25 |
| Methyl-propenyl disulfide | 2 |
| Dipropyl-disulfide | 60 |
| Propyl-propenyl disulfide | 8 |
| Diallyl-disulfide | 1 |

The ingredients are thoroughly and homogeneously mixed at 25° C. The mixture has an excellent onion flavor definitely enhanced over that obtained when the propyl propenyl disulfide and methyl propenyl disulfide constituents are omitted

EXAMPLE IV

The composition of example II is dissolved in propylene glycol in amount sufficient to give a propylene glycol solution containing 0.1 percent by weight of said mixture. 0.9 cc. of this solution is added to 7.3 g. of a soup base consisting of:

| Ingredient | Quantity (Parts/100 total) |
| --- | --- |
| Fine ground sodium chloride | 35.62 |
| Hydrolized vegetable protein [4 BE: Nestle's] | 27.40 |
| Mono sodium glutamate | 17.81 |
| Sucrose | 10.96 |
| Beef Fat | 5.48 |
| Sethness caramel color [powder B & C] | 2.73 |

The resulting mixture is added to 12 ozs. of boiling water to create a soup having an excellent onion flavor.

A composition the same as that of example II but containing only the propenyl disulfides, when added to the above soup base and the mixture then added to boiling water, gives a soup having a good onion flavor. Similar results are obtained when either the methyl propyl disulfide or propyl propenyl disulfide is used alone rather than in combination with each other.

EXAMPLE V 0.5 grams of the mixture of example III is emulsified in a solution containing the following materials:
  100 grams gum arabic
  100 grams water
  0.5 grams 20 percent solution in
    ethanol of butylated hydroxy
    anisole.

The resultant emulsion is spray-dried in a Bowen Lab. Model spray-drier, inlet temperature 500° F., outlet temperature 200° F. 12 grams of this spary-dried material is mixed with 29.2 grams of the soup base set forth in example IV. The resulting mixture is then added to 12 ounces of boiling water, and an excellent onion-flavored soup is obtained.

EXAMPLE VI 330 grams of gelatin is dissolved at 40° C. in 8,250 grams of deionized water to form a "gelatin solution."

330 grams of spray-dried gum arabic is dissolved at room temperature in 8,250 grams of deionized water to form a "gum arabic solution".

The gum arabic solution is placed in a 30 liter vessel and 2.5 liters of the gelatin solution is added. The temperature of the mixture is adjusted to 37 to 40° C. Through a tube beneath the surface of the gum arabic solution, 4,000 grams of 0.1 percent (by weight) solution of the mixture of example III in propylene glycol is added over a period of approximately 30 minutes.

The mixture is agitated at 37° to 40° C. until an average droplet size of 25 microns is obtained. The remaining gelatin solution (6 liters) is then added. The pH of the solution is then adjusted to 4.5 to 4.6, with a 10 percent sodium hydroxide solution.

After the 25 micron droplet size is achieved, the temperature is allowed to drop to 25° C. over a period of approximately 25 hours while maintaining the pH at 4.5 to 4.6.

The capsule slurry is then stirred and cooled to 5° C. and is maintained at 5° C., with stirring, for at least 2.5 hours. The slurry is then spray-dried.

The capsules thus formed are filtered and mixed with the soup base of example IV in the weight ratio of 1:6. 20 grams of the resulting capsule-soup base mixture is then added to 30 ounces of boiling water thereby creating a soup having an excellent onion flavor.

EXAMPLE VII

The following ingredients are selected and mixed as described in example II and yield a composition having excellent onion flavor.

| Ingredient | QUANTITY (Parts/100 total) |
|---|---|
| a. | |
| Methyl propenyl disulfide | 5 |
| Methyl propenyl trisulfide | 5 |
| 3,4 Dimethyl thiophene | 1 |
| Dimethyl disulfide | 25 |
| Dipropyl disulfide | 64 |
| b. | |
| Propyl propenyl disulfide | 15 |
| Methyl propenyl disulfide | 5 |
| Propyl propenyl trisulfide | 5 |
| Dipropyl disulfide | 25 |
| Corn oil | 50 |
| c. | |
| Methyl propenyl trisulfide | 9 |
| Propyl propenyl trisulfide | 9 |
| Propyl propenyl disulfide | 30 |
| Dimethyl disulfide | 1 |
| Diallyl disulfide | 1 |
| Gum arabic | 50 |

EXAMPLE VIII

PREPARATION OF TRISULFIDES
a. METHYL TRISULFUR CHLORIDE
Materials:

3.5 gm. (0.044 mole) HSSCH$_3$ (methyl hydrodisulfide)

4.8 gm. (0.044) 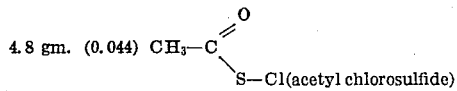 (acetyl chlorosulfide)

Quartz equipment including a 10 ml. flask is heated for 1 hour at 105° C. on vacuo. After cooling, the joints are sealed with phosphoric acid (85 percent) and the entire system then flushed with dry hydrogen chloride gas.

The methyl hydrodisulfide is then added to the 10 ml. flask and cooled to −20° C. and the acetyl chlorosulfide is added with stirring. The mixture is then allowed to warm to 0° C. and the reaction mass is then subjected to a slight vacuum. The reaction mixture is then distilled and

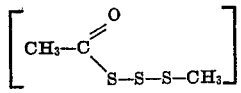

(acetyl methyl trisulfide) is collected under vacuum. The acetyl methyl trisulfide is then placed into a 10 ml. quartz flask and cooled to −35° C. Sulfuryl chloride (0.044 moles) is added while maintaining the reaction mass at −35° C. During the period of addition (30 minutes). Immediately subsequent to the addition, the reaction mass is allowed to warm to room temperature and SO$_2$ and acetyl chloride are removed.

The material remaining in the flask, methyl trisulfur chloride (CH$_3$SSSCl), is used in step (b).

When the above procedure is repeated using in place of the methyl hydrodisulfide equivalent amounts of other alkyl hydrodisulfides, the corresponding alkyl trisulfur chloride is obtained.

b. METHYL PROPENYL TRISULFIDE

Into a 250 ml. round bottom flask equipped with stirrer, condenser, nitrogen purge, calcium chloride drying tube and dropping funnel are added the following ingredients:
20 ml. tetrahydrofuran;
1.4 g. magnesium turnings.

A crystal of iodine and a few drops of methyl iodide with approximately 0.5 ml. of 1-bromo-1-propene are added to initiate the reaction which is indicated by the disappearance of the iodine color and the formations of a pale brown color. The remaining 1-bromo-1-propene is added in 20 ml. of tetrahydrofuran at a rate to maintain the reaction mass temperature between 40°–45° C. The total amount of 1-bromo-1-propene is 7.1 g. The addition time is one-half hour. The reaction mass is then heated for one hour at 70°–80° C. with continued stirring and the reaction mixture cooled with stirring to 0° C. via an ice bath. The stirring is continued to keep the reagent in suspension. The trisulfur chloride obtained in step (a) is then added fairly rapidly from the dropping funnel. As more is added, the reaction mixture becomes more liquid and dark brown in color. The reaction mixture is then washed twice with water and then filtered through sodium bicarbonate (anhydrous) in order to dry it. The mass is concentrated in vacuum to a dark brown oil, containing methyl cis propenyl trisulfide and methyl trans propenyl trisulfide. These may be separated and isolated using liquid gas chromatographic techniques as previously described in example I.

The corresponding trisulfides are obtained when equivalent amounts of other 1-bromo-1-alkenes are used in place of the 1-bromo-1-propene in the above procedure, and when equivalent amounts of other alkenyl trisulfur halides are used in place of the methyl trisulfur chloride.

What is claimed is:

1. The method for applying an onion flavor to food which comprises adding to the food an effective quantity of an unsaturated disulfide compound having the formula:

wherein R and R$_1$ and lower alkyl and R' is hydrogen or lower alkyl, the alkyl groups having up to five carbon atoms.

2. A method according to claim 1 wherein there is added at least one additional sulfide having the formula:

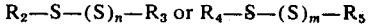

where $n$ is 0,1, or 2; R$_3$, and R$_5$ are lower alkyl; having up to five carbon atoms; $m$ is 0 or 2; and R$_4$ is alkenyl.

3. A process according to claim 1 wherein there is also added 3,4-dimethylthiophene.

4. A process according to claim 3 wherein the amount of dimethylthiophene is up to 0.20 times the amount of the compound.

5. The method of claim 1 wherein said compound is methyl propenyl disulfide or propyl propenyl disulfide.

6. The method according to claim 5 wherein the compound is added in a composition which comprises (a) from 0.0005 to 99.5 percent of the unsaturated disulfide compound; (b) from 0 to 99.995 percent of at least one additional sulfide having the formula:

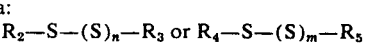

wherein $n$ is 0,1, or 2; R$_2$, R$_3$, and R$_5$ are lower alkyl having up to five carbon atoms; $m$ is 0 or 2; and R$_4$ is alkenyl; (c) from 0 to 99.995 percent of an edible diluent, the percentages being based on the total weight of the composition; and (d) 3,4-dimethylthiophene ranging in amount from zero to 0.20 times the weight of the unsaturated disulfide compound.

7. A composition suitable for imparting an onion flavor to foods which comprises (a) from 0.005 to 99.5 percent of methyl propenyl disulfide or propyl propenyl disulfide or mixtures thereof; (b) from 0 to 99.995 percent of at least one additional sulfide having the formula:

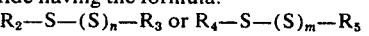

wherein $n$ is 0,1, or 2; R$_2$, R$_3$, and R$_5$ are lower alkyl having up to five carbon atoms; $m$ is 0 or 2; and R$_4$ is alkenyl; (c) from 0 to 99.995 percent of an edible diluent, the percentages being based on the total weight of the composition; and (d) 3,4-dimethylthiophene in an amount from 0.05 to 0.1 times the total amount of component (a).

* * * * *